July 20, 1954 R. P. DIMMER 2,684,436

MOBILE STATION CONTROL CIRCUIT FOR MOBILE RADIO TELEPHONE SYSTEMS

Filed Oct. 12, 1950 2 Sheets-Sheet 1

INVENTOR.
ROBERT P. DIMMER

BY [signature]

ATTORNEY

INVENTOR.
ROBERT P. DIMMER

BY *Wm. Watts Owen*

ATTORNEY

Patented July 20, 1954

2,684,436

UNITED STATES PATENT OFFICE 2,684,436

MOBILE STATION CONTROL CIRCUIT FOR MOBILE RADIO TELEPHONE SYSTEMS

Robert P. Dimmer, Chicago, Ill., assignor to Automatic Electric Laboratories, Inc., Chicago, Ill., a corporation of Delaware Application October 12, 1950, Serial No. 189,875

2 Claims. (Cl. 250—6)

The present invention relates to telephone systems in general, and more particularly to an urban mobile radio telephone system in which a fixed, or control station is the medium for interconnecting calling and called subscriber substations, and in which the connection comprises both mobile (isolated) and exchange connected subscribers.

It is a principal object of the invention to provide an urban mobile radio telephone system of a type that is simple and economical in design, yet easy, reliable and efficient in operation.

A further and more specific object is to provide improved auto-manual operation between mobile and exchange subscribers, and between mobile-to-mobile subscribers, in which all connections are extended by an operator.

A feature of the invention resides in the provision of equipment in each mobile unit for adapting the unit to be installed in the conveyance regardless of which terminal of the battery, or power supply, of the conveyance has been connected to its frame, or ground.

Another feature resides in the provision of a pulse receiver at each mobile unit having a minor switch including a single level of bank contacts and a plurality of control relays operated responsive to the operation of the minor switch, which is operated by incoming dial pulses, in which the relays are quickly operated from a high potential "kick" charge storage in a condenser.

Another feature is the provision of two relays in the radio transmitter, which are simultaneously operated responsive to the depression of a button in the mobile units' handset; one for switching the antenna from the radio receiver to the radio transmitter, and the other for energizing the radio transmitter and the handset.

The invention, both as to its organization and method of operation together with further objects and advantages thereof, will best be understood by reference to the specification taken in connection with the accompanying drawing in which.

The instant disclosure comprises a single channel mobile radio telephone system in which the frequency carrier transmitted from the transmitter at the control station is modulated by a 1500 cycle voltage by the tone oscillator at the control station. This tone is broken up into pulses, when the operator dials, for transmitting impulses representing interruptions to the mobile stations, where tone detectors are connected to the receivers at these stations to detect these pulse modulations for translation into switch controlling pulses. The radio frequency carrier transmitted from the transmitters of the mobile stations is not modulated by a tone voltage since none is needed to signal the operator. The carrier from the mobile stations is momentarily placed on the air responsive to the depression of the talk-listen buttons for operating the squelch relay in the control station's receiver. The operation of the squelch relay causes the operator's signal lamp to light, at which time the operator plugs in to answer the call and places the control station's carrier on the air to seize all the mobile stations.

It will be noted that the bank contacts of the minor switches in the mobile stations are wired according to each mobile station's individual call number, and that the call number of the illustrated mobile station (Figs. 1 and 2) is the two digit number "47," while the remaining contacts, with the exception of the first contact (1) and the last contact (0), are connected in multiple.

A general call feature is provided in the minor switch 209 in which if it is desired to signal all the mobile subscribers simultaneously, the operator at the control station dials the single digit "0" for operating each minor switch to signal each mobile subscriber.

Having briefly described the apparatus involved in each figure and the various features and objects, a more detailed description of the equipment and its operation under certain conditions will follow.

*Mobile station control equipment*

Figure 1:
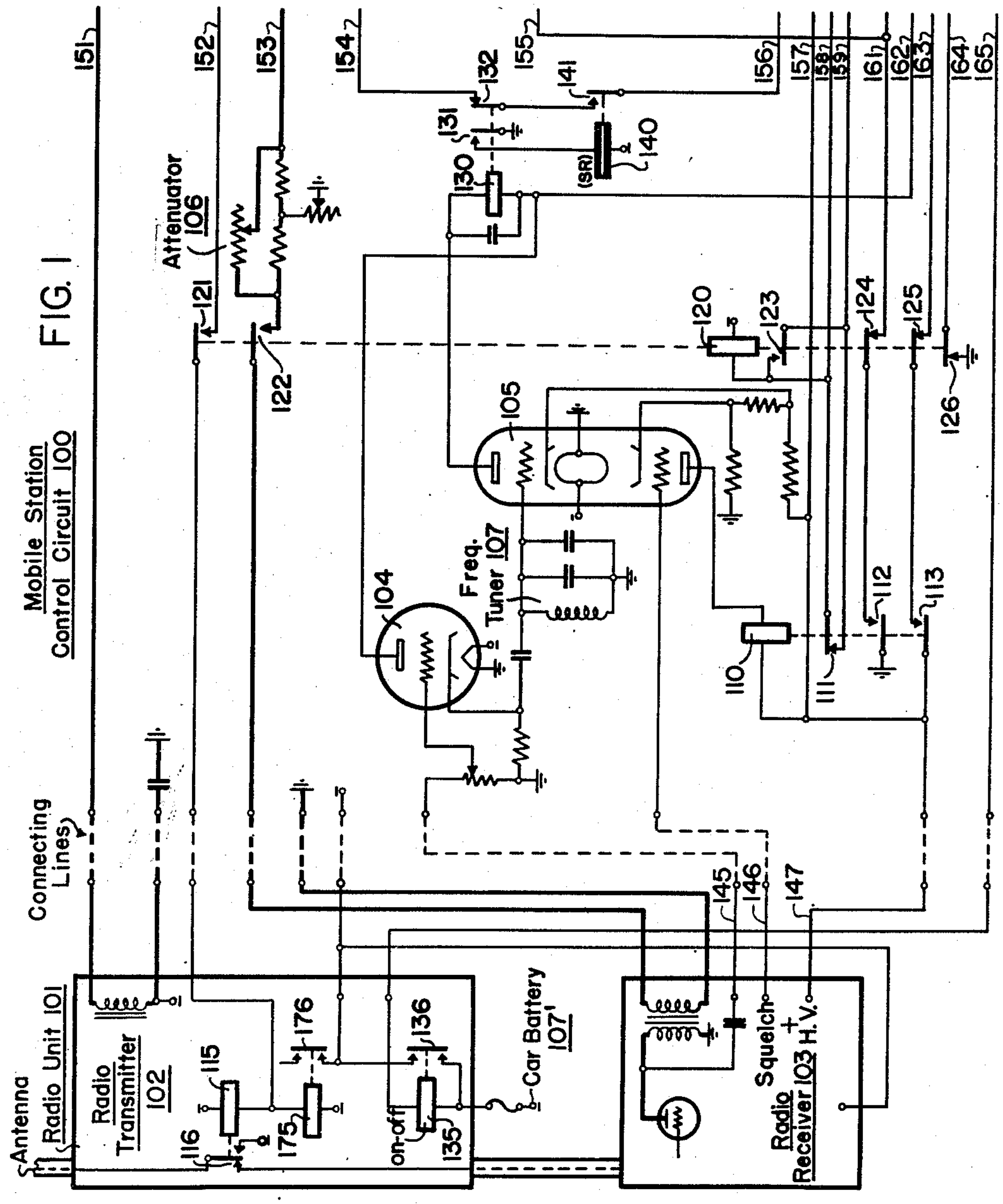
Figure 1 shows the radio unit and part of the control circuit of one of the mobile stations.
Figure 3:
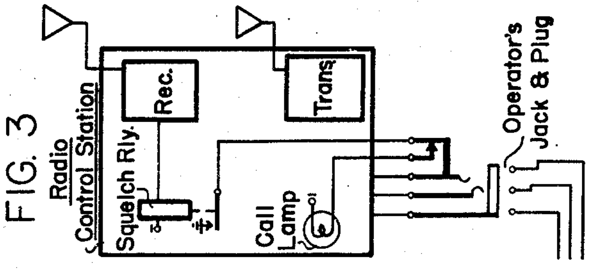
Figure 3 shows a block diagram at the left-hand side representing a radio control station having an operator's plug and jack and signal lamp.
Figure 2:
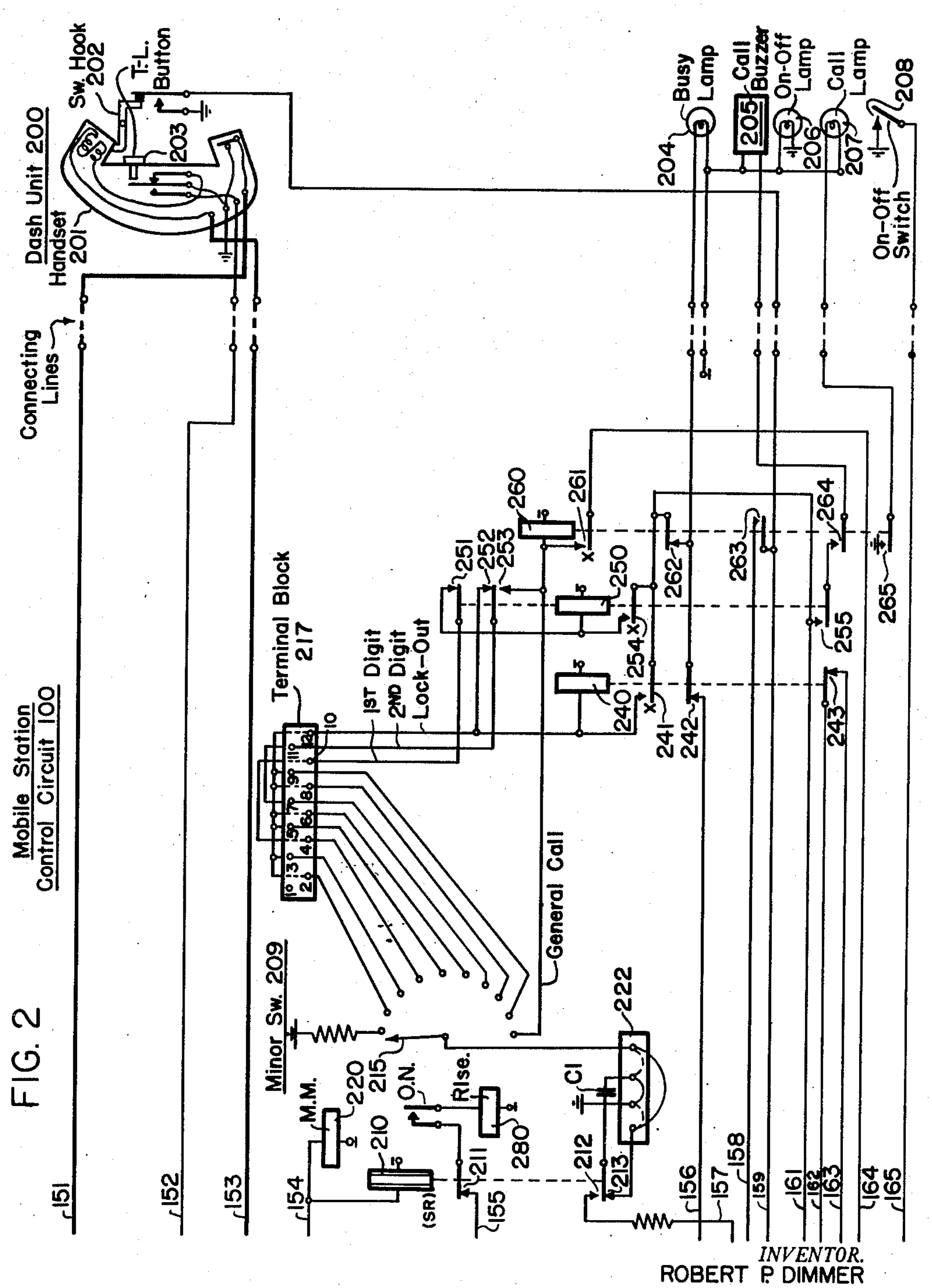
Figure 2 shows the remainder of the mobile station's control circuit and the dash unit.

Figures 1 and 2 show the circuit arrangement of the mobile station control equipment while Fig. 3 shows a block diagram representing the radio control station, within which is shown the operator's signal lamp and plug.

All of this equipment except the radio control station is located at the mobile unit and is suitably mounted therein. The mobile station's control equipment may be subdivided into the dash unit 200, the mobile station control circuit 100 and radio unit 101.

Radio unit 101 comprises mainly a radio receiver 103 and a radio transmitter 102. It will be noted that both the receiver 103 and transmitter 102 use the same antenna (not shown) for receiving and sending the carrier frequencies. An on-off relay 135 is located in transmitter 102 and operated responsive to the closing of on-off master switch 208 for applying battery potential from car battery 107' to all the battery symbols in the drawings and to supply power for initiating the energization of transmitter 102. Two talk-listen relays 115 and 175 are also located in the transmitter 102 and are operated responsive to the depression of the talk-listen button 203 in the handset 201. Talk-listen relay 175 completes a circuit for providing power to cause the transmitter to be energized and also provides power for handset 201. Talk-listen relay 115 switches the antenna from the receiver 103 to the transmitter 102 responsive to the depression of the talk-listen button 203 in handset 201, and releases responsive to the release of button 203 for switching the antenna back to the receiver 103.

The dash unit comprises mainly a handset 201, switchhook springs 202, busy lamp 204, call buzzer 205, on-off lamp 206, call lamp 207 and on-off master switch 208. Handset 201 contains the talk-listen button 203 which is depressed during talking and released during listening.

The mobile station control circuit 100 comprises mainly a cathode-follower tube 104, duotriode tube 105, minor switch 209, attenuator 106, and the relays, conductors, condensers and resistors necessary for the proper operation thereof. The upper section of tube 105 serves as a detector for rectifying the incoming pulses of tone, while the lower section of tube 105 serves for operating squelch relay 110 responsive to receipt of incoming carrier. Minor switch 209 is shown as a rotary switch having a single level of bank contacts, with the bank contacts connected to terminal block 217. Suitable strapping is employed at the rear of the terminal block 217 for connecting the first and second digit leads to the bank contacts corresponding to the first and second digits of the mobile station's call number, while all the other contacts of the contact bank are connected to the lock-out lead. The minor switches 209 in the other mobile stations (not shown) have their bank contacts wired to different digit leads in accordance with their individual two digit call numbers.

When a call is initiated by the mobile unit, the mobile subscriber removes his handset 201 from the switchhook 202 and momentarily depresses the talk-listen button 203, which operates relays 115 and 175. The operation of relays 115 and 175 switches the antenna to the transmitter and puts the mobile subscriber's carrier on the air in the well-known manner. The reception of this carrier at the radio control station causes the operator at the control station to be signalled and the control station's carrier is put on the air responsive to the operator's plugging in to answer the call in the well-known manner. The control station's carrier is received at all the mobile stations and operates all the squelch relays such as 110 for locking out all the mobile stations but the one that has initiated the call, and for lighting all the idle mobile station's busy lamps such as 204.

When a call to a mobile station is initiated, the operator at the radio control station causes the radio station's carrier to be placed on the air. This radio station's carrier is received at all the mobile stations and causes a subsequent operation of all the squelch relays such as 110, which operate to lock out all the mobile stations for the present. The operated squelch relays also light all the busy lamps such as 204; prepare an operating circuit for the minor switches such as 209, and complete the plate circuits for tubes such as 104 and the upper section of tubes such as 105. A modulated tone of approximately 1500 cycles is placed on the carrier from the control station when its carrier goes on the air, with this tone broken into pulses, or interruptions, when the operator dials. The carrier with the 1500 cycle tone modulation is influenced by an impedance change due to the cathode-follower tubes such as 104, and at the frequency tuners such as 107 only the 1500 cycle tone is allowed to pass to the grid of the upper section (detector) of tubes such as 105. When the signal applied to the grid of the upper section of the tubes 105 reaches a value that is above the cut-off bias, plate current flows. Relays such as 130 will then operate when this plate current reaches a certain value. Relays such as 140 operate subsequent to the operation of the relays 130 and will remain operated until a mobile subscriber answers the call and opens the plate circuits of the tube 104 and the upper section of tube 105, whereupon the corresponding relay 130 restores. When dialling is started, the 1500 cycle tone is broken up into pulses, with the relays 130 restoring during the half of the pulse that the tone is removed. Each time relays 130 restore, a circuit is completed for motor magnets such as 220, which operate to advance the wipers such as 215 one step at a time. When the relays 130 restore responsive to receipt of the first pulse, the relays such as 210 operate and remain operated during pulsing, but restore between digits and after pulsing.

Assuming that the dialling of the first digit (4) of the illustrated call number (shown to be 47) is completed, the wiper 215 of the illustrated mobile unit will be engaged with the fourth contact of the contact bank, with a circuit being completed to relay 250 from the charged condenser C1 which will discharge as soon as relay 210 restores. The release magnet 280 operates responsive to the restoration of relay 210 and restores wiper 215 to normal. The same operations occur when the second digit (7) of the call number is dialled, with relay 260 operating from the charged condenser C1. The release magnet 280 again restores wiper 215, and the operation of relay 260 signals the mobile subscriber both audibly and visually that a call is awaiting.

Terminal block 222 has been provided to include a strapping arrangement for charging the condenser C1 dependent upon how the car battery is installed in the car. The dotted connections in the terminal block 222 are used when the negative terminal of the car battery is connected to ground, or the frame of the car. It will be noted that under these conditions, all the battery symbols (as shown in the drawings) will be changed to ground symbols, and all the ground symbols will be changed to battery symbols. On the other hand, if the positive terminal of the car battery is connected to ground, or the frame of the car, the solid connections in the terminal block 222 will be used (as shown) and the battery and ground symbols of the drawings will remain as shown.

*Call from mobile subscriber to exchange subscriber*

The operation of the equipment during a call from a mobile subscriber to an exchange subscriber will now be explained. However, before initiating the call, the mobile equipment is normally energized in the following manner: The on-off switch 208 is closed and a circuit is completed for the on-off relay 135 in the radio transmitter 102. This circuit may be traced from ground at on-off switch 208, conductor 165 and through the winding of on-off relay 135 to the negative pole of car battery 107. In operating contacts 136, relay 135 applies negative battery potential to all the battery symbols in the drawings and prepares a power input for radio transmitter 102. The operation of relay 135 also lights on-off lamps 206.

Before continuing with the present explanation, it will be noted that all the battery symbols in the drawings represent connections to the negative pole of the battery 107. All the ground symbols in the drawings are connected to the frame of the car which is also connected to the positive battery terminal.

Upon initiating a call, the mobile subscriber removes handset 201 from switchhook 202. The closing of the contacts operated by switchhook 202 completes a circuit for relay 120, which may be traced from ground at the contacts switchhook 202, conductor 159, contacts 111 and through the winding of relay 120 to battery.

In operating contacts 121, relay 120 prepares a circuit for the control of relays 115 and 175 by the talk-listen button 203 in the hand-set 201; at contacts 122, prepares a point in the incoming voice circuit; at contacts 123 completes its own locking circuit; at contacts 124 opens a point in the control ground to the minor switch 209; at contacts 125 opens the plate circuit to tube 104 and the upper section of tube 105; and at contacts 126 removes another control ground associated with the minor switch.

The mobile subscriber now signals the operator at the radio control station by momentarily depressing his talk-listen button 203, which completes a circuit for operating talk-listen relays 115 and 175 in radio transmitter 102 over a circuit traced from ground at handset 201, through contacts operated by talk-listen button 203, conductor 152, contacts 121 and through the windings of relays 115 and 175 to battery.

In operating, relay 175 provides power for radio transmitter 102 at contacts 176, and relay 115 switches the antenna from radio receiver 103 to radio transmitter 102.

The mobile station's carrier is momentarily placed on the air and received at the control station for operating a relay to signal the operator at the radio station of an incoming call. The operator plugs in to answer the call and upon receiving the necessary information from the mobile subscriber, extends the call to the desired party.

Before the extension of the call is completed, and responsive to the operator answering the call, the carrier from the control station is placed on the air and the antenna at the mobile station is switched back to radio receiver 103 (when the mobile subscriber has released talk-listen button 203) for receiving the control station's carrier. Responsive to receipt of the control station's carrier, a ground potential is applied to conductor 146 for operating the lower section of tube 105. The operation of the lower section of tube 105 provides current for operating squelch relay 110.

It will also be noted that all such relays as 110 in all of the mobile stations will operate upon receipt of the radio station's carrier for locking out all other mobile units on the same channel and will also light all the busy lamps such as 204 over a circuit extending from ground at contacts 112, contacts 124, conductor 161, contacts 262 and thru lamp 204 to battery.

It will be assumed that the operator has now completed extension of the call and that the called party is rung in the usual manner. Upon answering by the called party, conversation proceeds in the usual manner with the mobile subscriber depressing his talk-listen button 203 to talk and releasing the button to listen.

Upon completion of conversation, the called party hangs up and the control station's carrier is removed from the air responsive to the operator removing her plug, thereby restoring all the relays such as 110, and all the busy lamps such as 204. When the mobile subscriber replaces his handset 201 the circuit is opened to relay 120 and it restores. The mobile equipment is now at rest and conditioned for future calls.

*Call to mobile subscriber from exchange subscriber*

The operation of the equipment during a call to a mobile subscriber from an exchange subscriber will now be explained. It will be noted that the mobile equipment has been energized as described in the previous section entitled "Call from mobile subscriber to exchange subscriber."

When a call is initiated by an exchange subscriber and answered by the operator at the radio control station, the operator places the control station's carrier on the air in response to the control station being seized by the exchange subscriber. Primarily, the reception of the control station's carrier causes all radio receivers such as 103, in all of the mobile stations, to place a ground on all conductors such as 146 for causing the lower section of all such tubes as 105 to pass current and thereby operate all squelch relays such as 110. The operation of the relays 110 will lock out all the mobile stations for the present.

Referring in particular to the mobile station shown in Figs. 1 and 2, it will be seen that in operating contacts 111, relay 110 opens a point in the operating circuit of relay 120, at contacts 112 a circuit is prepared for minor switch 209 and at contacts 113, the plate circuits of tube 104 and the upper section of tube 105 are completed. It will also be noted that the closing of contacts 112 also completes a circuit for lighting all such busy lamps as 204, with this circuit being traced from ground at contacts 112, contacts 124, conductor 161, contacts 262 and through busy lamp 204 to battery.

The carrier transmitted from the control station is modulated by a 1500 cycle tone. This carrier is received at radio receiver 103 and a high level of it undergoes an impedance change by the cathode follower tube 104, and at frequency tuner 107 only the 1500 cycle tone is allowed to pass to the grid of the upper section of tube 105. When the signal applied to the grid in the upper section of tube 105 reaches a value that is above the cutoff bias value, plate current flows. This plate current may be traced from the plate of the upper section of tube 105 through the winding of relay 130, conductor 162, contacts 243, conductor 163, contacts 125, 113, conductor 147 and to the positive high voltage potential in radio receiver 103. The 1500 cycle tone is broken up into pulses when the operator dials, and the upper section of tube 105 detects and rectifies these pulses so that they are splashes of direct current.

It will be assumed that the call number of the illustrated mobile station comprises the two digit number "47." As previously stated, the steady input of 1500 cycle tone (prior to dialing) causes the upper section of tube 105 to pass direct current. When this current reaches a certain value, relay 130 will operate over a circuit previously described when tracing the plate current flow.

In operating contacts 131, relay 130 completes an obvious circuit for the slow-to-release relay 140, at contacts 132 opens a point in the pulsing circuit to motor magnet 220 and the operating circuit of relay 210. In operating contacts 141, relay 140 also prepares a point in the operating circuit to motor magnet 220 and relay 210.

When the first digit "4" of the call number is dialed by the operator, four impulses are received and detected by the upper section of tube 105. During the break period of the first pulse, relay 130 restores, with relay 140 remaining operated, and at contacts 132 completes a circuit for motor magnet 220 and slow-to-release relay 210. These circuits may be traced from ground at contacts 112, contacts 124, conductor 161, contacts 262, 242, conductor 156, contacts 141, 132, conductor 154 and through the windings of motor magnet 220 and relay 210 to their respective batteries. In operating contacts 211, relay 210 opens a point in the circuit to the release magnet 280, and at contacts 212 completes a charging circuit for condenser C1 which may be traced from the high voltage positive potential in radio receiver 103, conductor 147, conductor 157, contacts 212 to the left-hand terminal of condenser C1. Ground is supplied through an obvious circuit to the right-hand terminal of condenser C1.

In operating, motor magnet 220 advances wiper 215 of the minor switch 200. When the second half, or tone part, of the first pulse is received, relay 130 again operates, and at contacts 132 opens the circuit to motor magnet 220 and relay 210. Since relay 210 is constructed as being slow-to-release, it will not restore during pulsing, but will restore between digits and at the end of dialling.

The interaction between motor magnet 220 and relay 130 now continues until the end of the first series of pulses of the first dialled digit, at which time it will be seen that wiper 215 is engaged with the fourth contact of the contact bank. The circuit to motor magnet 220 and relay 130 is again opened responsive to relay 130 operating when the second half, or tone part, of the fourth impulse is received. Upon restoring at contacts 211, relay 210 completes a circuit for the release magnet 280 and at contacts 213 completes a discharge circuit for condenser C1 which operates relay 250. The relatively high charge at condenser C1 will cause relay 250 to operate extremely fast before release magnet 280 has had time to operate. The discharge circuit for condenser C1 and for operating relay 250 may be traced from ground through condenser C1, contacts 213, the lower heavy conductor at terminal block 222, wiper 215 and its engaged fourth contact, terminal block 217, the first digit conductor, contacts 251 and through the winding of relay 250 to battery.

It will be noted that as the wiper 215 stepped off-normal, the off-normal springs ON were closed and therefore, as contacts 211 restored, the operating circuit for release magnet 280 is completed and may be traced from ground at contacts 112, contacts 124, conductor 161, conductor 155, contacts 211, off-normal contacts ON and through the winding of release magnet 280 to battery. Release magnet 280 now operates and restores wiper 215 to normal in the usual manner, at which time off-normal contacts on ON will open.

In operating "X" contacts 254, relay 250 completes its own locking circuit, which may be traced from ground at contacts 112, contacts 124, conductor 161, contacts 254 and through the winding of relay 250 to battery. At contacts 251, relay 250 opens its energizing circuit, at contacts 253 a circuit is prepared for relay 260, and at contacts 255 a circuit is prepared for buzzer 205.

The second digit (7) of the mobile station's call number is now dialled, with relay 130 pulsing as previously mentioned, and motor magnet 220 and relay 210 operating as also previously mentioned. Therefore, at the end of the received pulses of the second digit it will be seen that wiper 215 is engaged with the seventh contact of the contact bank. Also, when the second half, or tone part of the last pulse of the last digit is received, motor magnet 220 restores and relay 210 will also restore, and at contacts 213 will complete a discharge circuit of condenser C1 to operate relay 260. This discharge circuit of condenser C1 used for operating relay 260 may be traced from ground through condenser C1, contacts 213, the lower heavy conductor at terminal block 222, wiper 215 and its engaged seventh contact, terminal block 217, the second digit conductor, contacts 253 and through the winding of relay 260 to battery.

Since condenser C1 has been charged by a relatively high potential during the time relay 210 is operated, relay 260 will operate extremely fast and before release magnet 280 has had time to operate. Relay 260 has operated as previously stated, and release magnet 280 now operates to return wiper 215 to normal in the usual manner.

In operating "X" contacts 261, relay 260 completes its own locking circuit, which may be traced from ground at contacts 126, conductor 164, "X" contacts 261 and through the winding of relay 260 to battery. At contacts 262, relay 260 opens the circuit to busy lamp 204 and also removes the ground potential for operating motor magnet 220 and relay 210; at contacts 263 a circuit is prepared for relay 120; at contacts 264 a circuit is completed for call-buzzer 205, which may be traced from ground at contacts 112, contacts 124, conductor 161, contacts 255, 264 and through the buzzer 205 to battery, and at contacts 265 an obvious circuit is completed for lighting call lamp 207.

Responsive to the audible and visual signals transmitted by the call-buzzer 205 and the call-lamp 207, the mobile subscriber answers the call by removing his handset 201 from the switchhook 202, thereby, completing a circuit for relay 120. This circuit may be traced from ground at switchhook springs 202, contacts 263, conductor 158 and through the winding of relay 120 to battery.

In operating contacts 121, relay 120 prepares a circuit for the operation of talk-listen relays 115 and 175 under control of the talk-listen button 203. At contacts 122, relay 120 completes the incoming voice signalling circuit between radio receiver 103 and the receiver in handset 201. At contacts 123, relay 120 completes its own locking circuit. At contacts 124, the operating ground for the buzzer 205 and the minor switch 209 is removed and relay 250 restores. At contacts 125, the plate circuits to tube 104 and the upper section of tube 105 are opened and relay 130 restores, and at contacts 126 the locking circuit for relay 260 is opened and it restores.

In restoring, relay 130 opens the circuit to relay 140 and it restores. In restoring, relay 260 opens the circuit to extinguish call lamp 207.

Conversation now proceeds in the usual manner, with the mobile subscriber depressing his talk-listen button 203 to talk, and releasing the button to listen in the same manner as described in the previous section.

When the conversation is completed and responsive to the calling party hanging up, the operator at the control station severs the connection to remove the control station's carrier from the air and relay 110 restores. When the mobile subscriber replaces his handset 201, the circuit is opened to relay 120 and it restores.

The mobile equipment is now at rest and conditioned for future calls.

*Call from mobile subscriber to mobile subscriber*

The operation of the equipment during the initiation and completion of a call from one mobile subscriber to another mobile subscriber will now be explained.

It will be assumed that the calling mobile subscriber is the one shown in Figs. 1 and 2 and that the called mobile subscriber contains identical equipment as shown in Figs. 1 and 2 with the exception that the strappings at terminal block 217 are arranged to coincide with the call number assigned to the called station.

It will also be assumed that the equipment at the calling mobile station has operated the same as described in the section entitled "Call from mobile subscriber to exchange subscriber" up to and including the point wherein the mobile subscriber has signalled and established communication with the operator at the control station.

The calling mobile subscriber now informs the operator that he desires to call another mobile subscriber and then informs the operator of the called mobile subscriber's call number. The calling subscriber does not replace his handset and thereby prevents the operation of his pulse receiver which would normally operate in response to subsequent dialing by the operator. Therefore, it will be seen that the removal of the handset by the calling subscriber has operated relay 120 and that relay 120 will stay operated as long as the handset is off the switchhook. The operation of relay 120 has opened the control ground circuit to the minor switch at contacts 124, and at contacts 125 opened the plate circuits to tube 104 and the upper section of tube 105.

When the control station's carrier comes on the air in response to the operator plugging in to answer the call (originated by the calling mobile subscriber), the carrier is received by all the mobile stations and all the squelch relays such as 110 operate (with the exception of the calling mobile station).

The operation of the squelch relays 110 in all the mobile stations but the calling one complete the plate circuits to all such tubes as 104 and the upper section of all such tubes as 105, and also prepares a control ground circuit for all minor switches 209.

When the operator dials the call number of the desired mobile subscriber, the equipment at each of the mobile stations (with the exception of the calling one) operates as described in the section entitled "Call to mobile subscriber from exchange subscriber."

When the first digit of the call number is dialed, the pulse receivers in all the mobile stations (with the exception of the calling one) operate, and all relays such as 240, in all the stations whose first digit of their call number does not correspond with the one dialed, will operate to open their pulsing circuits and prevent any further operation. At the remainder of the stations, whose first digit of their call number does correspond with the one dialed, a circuit is completed for operating all such relays as 250.

When the last digit of the desired call number is dialed by the operator, all relays such as 240 of the remaining stations, whose second digit of their call number does not correspond with the one dialed, will operate to prevent any further operation. At the remaining station whose last digit of its call number does correspond with the one dialed, a circuit is completed for its relay such as 260. The operation of the relay such as 260 will complete an audible and visual signalling circuit for informing the called mobile subscriber that a call is awaiting.

When the call is answered by the called mobile subscriber, the equipment operates as previously described in the section entitled "Call to mobile subscriber from exchange subscriber," and conversation may now proceed in the usual manner, with both the calling and called subscribers depressing their talk-listen buttons such as 203 to talk, and releasing the buttons to listen. The operator at the control provides continuous supervision, and in so doing, maintains connections (not shown) between the control station's receiver and trnsmitter, so that the calling and called mobile subscribers may converse with one another by means of the control station's receiver and transmitter.

When conversation is completed and each of the mobile subscribers hang up, their relays such as 120 restore. Since continuous supervision is provided by the operator as previously mentioned, the control station's carrier will be removed from the air as soon as the operator notes that the conversation is completed. The operator then severs the connection at the control station for restoring both squelch relays such as 110 at the mobile stations. The equipment is now at rest and conditioned for future calls.

It will be noted that similar operations of the equipment take place if the other pole of battery is connected to the frame (or ground) of the car, and the dotted connections of terminal block 222 are used instead of the heavy connections. At this time it will be appreciated that if the normal pole connections of the battery are reversed i. e., when the negative pole is grounded to the frame of the car and the above-noted dotted connections are used, the charging circuit for condenser C1 will be altered from the previously traced charging circuit in that when the motor magnet 229 of the minor switch 209 responds upon receipt of each series of incoming pulses for stepping the switch, the charging circuit for condenser C1 is completed at the instant that wiper 215 momentarily engages the first contact of the contact bank during the movement of the wiper thereover.

This charging circuit may be traced from the positive high voltage supply in the radio receiver 103, conductor 147, conductor 157, contacts 212 to the left-hand plate of condenser C1, the right-hand plate of condenser C1, the right-hand dotted strapping of terminal block 222, wiper 215, momentarily engaged first contact, resistance, and to grounded battery. It will also be noted that due to static or a long pulse of speech, the minor switches such as 209 of the mobile stations not in use may be stepped to their first contact. Therefore, the digit 1 is omitted from all the first digits of all the mobile station's call numbers and at the end of the pulse the minor switch will release. It will be seen that the first contact is not connected to any relays such as the other contacts are, but instead is connected to ground.

A general call feature has been provided in each mobile unit in which the last, or tenth, contact in the bank of minor switch 209 is directly connected to all such relays as 260. All the mobile subscribers may be signalled simultaneously by the operator responsive to the dialing of a single digit "0," after which, the equipment at each mobile station will operate the same as described in the previous section entitled "Call to mobile subscriber from exchange subscriber," with the exception that only one digit is dialed instead of the usual two, and all stations are signalled instead of just one.

Having described my invention, what is considered new and desired to have protected by Letters Patent will be pointed out in the appended claims.

What is claimed is:

1. In a communication system for providing selective communication between a central office and a plurality of movable vehicles, a radio control station, a mobile subscriber station, means in said control station for transmitting a frequency carrier, means in said mobile station operated responsive to the receipt of said carrier for seizing said mobile station, means in said control station for superimposing upon said carrier selective codes consisting of a plurality of digital series of modulated tone oscillations, means in said mobile station for detecting and rectifying said oscillations, means for signalling said mobile subscriber, a plurality of control relays for operating said signalling means when they are operated, a condenser, a circuit for charging said condenser, a lockout relay for rendering said selector means ineffective, circuits for discharging said condenser, lockout and selector means operated only in response to the detection and rectification of each series of oscillations of a predetermined selective code to charge said condenser over its charging circuit and to discharge said condenser through one of said control relays, thereby to operate said relays to operate said signalling means, said selector means operated in response to the detection and rectification of oscillations of a received code other than said predetermined selective code to charge said condenser over its charging circuit and to discharge said condenser through said lockout relay, thereby to operate said lockout relay to render said selector means ineffective, means for maintaining said lockout relay operated, means whereby said last means is operated and effective so long as said mobile station receives said carrier frequency, and means operated responsive to the operation of said control relays for rendering said selector means ineffective.

2. The combination claimed in claim 1, including message reproducing means in each mobile station for reproducing messages received by said mobile station, a switching relay, a circuit including contacts on said switching relay for rendering said message reproducing means effective, a pair of operating circuits for said switching relay, means operated responsive to the receipt of said carrier for opening one of said operating circuits, and means operated only in response to the operation of said control relays upon the receipt of said predetermined selective code for preparing the other operating circuit of said switching relay, a handset and cradle associated with said mobile unit, means operated responsive to the removal of the handset from the cradle after receipt of said selective code for completing said other operating circuit to operate said switching relay to complete the circuit for rendering said message reproducing means effective, and means operated responsive to the removal of the handset from the cradle to initiate a call at the mobile station when the carrier frequency is not being received by the mobile station for completing said one operating circuit to operate said switching relay to complete the circuit for rendering said message reproducing means effective, and means in the mobile station operated responsive to the operation of the switching relay for maintaining the switching relay operated until the handset is replaced on the cradle.

References Cited in the file of this patent

UNITED STATES PATENTS

| Number | Name | Date |
|---|---|---|
| 2,063,354 | Thorp | Dec. 8, 1936 |
| 2,427,750 | Snyder | Sept. 23, 1947 |
| 2,427,751 | Snyder | Sept. 23, 1947 |
| 2,501,091 | Preston et al. | Mar. 21, 1950 |
| 2,530,815 | Dimmer | Nov. 21, 1950 |
| 2,600,648 | Herrick | June 17, 1952 |